United States Patent [19]
Brams et al.

[11] Patent Number: 5,788,995
[45] Date of Patent: Aug. 4, 1998

[54] APPARATUS FOR MAKING A COMPOSITE THERMOPLASTIC AND SILICONE ARTICLE

[75] Inventors: Peter Brams, München; Peter Lichtinger, Fürstenfeldbruck, both of Germany

[73] Assignee: Krauss-Maffei AG, Munich, Germany

[21] Appl. No.: 709,096

[22] Filed: Sep. 6, 1996

[30] Foreign Application Priority Data

Sep. 7, 1995 [DE] Germany .................. 195 33 137.0

[51] Int. Cl.⁶ .................. B29C 45/04; B29C 45/14; B29C 45/73
[52] U.S. Cl. .................. 425/127; 249/111; 264/328.2; 264/328.8; 425/117; 425/543; 425/547; 425/453
[58] Field of Search .................. 264/328.2, 328.4, 264/328.8, 328.11, 328.13; 425/552, 588, 453, 112, 117, 127, 547, 5; 249/111

[56] References Cited

U.S. PATENT DOCUMENTS

| | | | |
|---|---|---|---|
| 4,885,121 | 12/1989 | Patel | 264/328.8 |
| 5,221,538 | 6/1993 | Gasami et al. | 264/328.8 |
| 5,472,655 | 12/1995 | Morita | 264/328.8 |

FOREIGN PATENT DOCUMENTS

| | | |
|---|---|---|
| 0 249 336 | 12/1987 | European Pat. Off. . |
| 0 350 745 | 1/1990 | European Pat. Off. . |
| 2 063 850 | 12/1970 | Germany . |
| 20 24 082 | 12/1990 | Germany . |
| 42 15 009 | 11/1995 | Germany . |
| 3 133 610 | 6/1991 | Japan . |
| 5 084 780 | 4/1993 | Japan . |
| 8 047 943 | 2/1996 | Japan . |
| 86/06273 | 11/1986 | WIPO . |

OTHER PUBLICATIONS

Plast Verarbeiter, 46, Jahrgang, 9 Sep. 1995; "Kalte Verschlüsse Für, Heisses Silikon", H. Emmerichs et al. 3 pages.

*Primary Examiner*—Khanh P. Nguyen
*Attorney, Agent, or Firm*—Herbert Dubno

[57] ABSTRACT

After a thermoplastic synthetic resin has been injection molded onto a transfer plate in a thermoplastic injection mold, the transfer plate is shifted into a silicone injection mold maintained at a high temperature and a silicone member is injection molded onto the thermoplastic member. The heat transfer to the thermoplastic body is minimized by, for example, providing insulating material between heated portions of the mold system and other portions thereof and/or by maintaining air gaps from which the silicone is excluded between the thermoplastic member and heated portions of the silicone injection mold.

15 Claims, 2 Drawing Sheets

APPARATUS FOR MAKING A COMPOSITE THERMOPLASTIC AND SILICONE ARTICLE

FIELD OF THE INVENTION

Our present invention relates to an apparatus for producing, by injection molding, an article consisting of a thermoplastic synthetic resin portion, i.e. a thermoplast portion, and a second portion of a silicone material, i.e. a silicone portion. More particularly this invention relates to an apparatus having a thermoplast injection molding die or mold with a first mold cavity for producing the portion to be composed of the thermoplastic material, especially a low-temperature thermoplastic material (i.e. a thermoplast having a low melting point) and a second injection molding tool or die with a second mold cavity for the silicone material, the silicone injection mold being heated.

BACKGROUND OF THE INVENTION

In the production of injection molded articles with a first portion composed of a thermoplastic material and a second portion composed of a silicone material, problems have arisen in the past because the silicone material must react to completion in a mold at high temperature and for long heating periods, there being a dependency between the heating time and the heating temperature. The silicone may require, for example, heating for 15 seconds at a temperature of 160° C. or heating for 5 seconds at a temperature of 220° C.

Under these temperatures and with such heating durations, the thermoplastic material can be heated above the melting point and can melt. In the past, therefore, when attempts were made to first mold the thermoplastic portion of the article and then introduce that portion into a silicone injection mold operated at high temperatures, the thermoplastic portion was distorted or deformed.

While it was possible to first injection mold the silicone portion at its high temperature and then mold the thermoplastic portion onto it, this could only be done economically with thermoplastic material with high temperature resistance, such as polytetrafluoroethylene (Teflon®). The drawback of such an article, however, is that the polytetrafluoroethylene is about eight times more costly than other more common thermoplastic materials.

As a consequence it is more common to separately injection mold the two portions of the article and then to assemble them in relatively costly and time-consuming manual operations.

OBJECTS OF THE INVENTION

It is the principal object of the present invention to provide an improved apparatus for injection molding a composite article, namely, an article composed of a low-temperature thermoplastic material and a silicone material molded under high temperature, whereby a single apparatus is used for producing the article.

Another object of the invention is to provide an apparatus for producing such article whereby drawbacks of earlier systems are avoided.

SUMMARY OF THE INVENTION

These objects and others which will become apparent hereinafter are attained, in accordance with the invention by providing a transfer injection mold part which forms part of the mold cavity in the thermoplastic injection mold in which the first or thermoplast portion of the article is formed and is movable into the silicone injection mold to form the second mold cavity with the first portion of the article whereby the silicone portion is formed on the thermoplast portion under conditions in which the parts of the silicone mold which includes the thermoplastic portion avoids heat transfer from the high-temperature silicone mold to the thermoplastic previously molded portion.

More particularly, the apparatus for producing an injection molded article having a first portion composed of a low melting point thermoplastic synthetic resin and another portion of a silicone can comprise:

a transfer injection mold part defining a portion of a shape of the article;

a thermoplast injection mold cooperating with the transfer injection mold part in a first position thereof to form a first cavity therewith for producing the first portion;

a silicone injection mold disposed next to the thermoplast injection mold and cooperating with the transfer injection mold part in a second position thereof and with the first portion on the transfer injection mold part to form a second cavity therewith for producing the other portion on the first portion to complete the article;

means for heating the silicone injection mold to an elevated temperature; and means for limiting heat transfer from the silicone injection mold to the first portion on the transfer injection mold part.

The invention recognizes that the relatively hot surfaces of the silicone injection mold cannot detrimentally affect the shape stability of a thermoplastic injection molded portion when the latter is contacted with these heated surfaces without pressure or where a relatively thin air gap is provided between these heated surfaces and the thermoplast portion. The air gap is so dimensioned, for example, by analogy to the venting passages which allow escape of air from the silicone injection mold, that no silicone material can penetrate into the air gap.

In a preferred embodiment, the silicone injection mold is equipped with insulating elements that are arranged between the parts of the silicone injection mold and the transfer mold part in which the thermoplastic portion of the article is received. The thermally-insulating elements, which preferably are composed of ceramic, serve to limit heat transfer from the heated silicone mold parts to the cooled transfer mold part and further serve as spacer elements which maintain the spacing between the transfer mold part and the heated mold part. They can also ensure that any contact between the transfer mold part and the heated mold part is without pressure, i.e. just a glancing contact.

Preferably heating means for the silicone mold part when confined to a region thereof directly in the region of the mold cavity and this portion is separated from the remainder of the silicone injection mold by the intermediary of insulating layers. This can ensure a minimum of heat transfer to adjoining areas and regions which might be detrimental to the thermoplastic molded portion of the article and reduces internal radiant heat loss and heat transfer.

Since thermoplastic materials and silicone materials generally do not bond together by being injection molded one onto the other, it is advantageous for the parts of the article, where the two materials meet, to have a form-fitting interconnection, thereby providing a stable structure.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
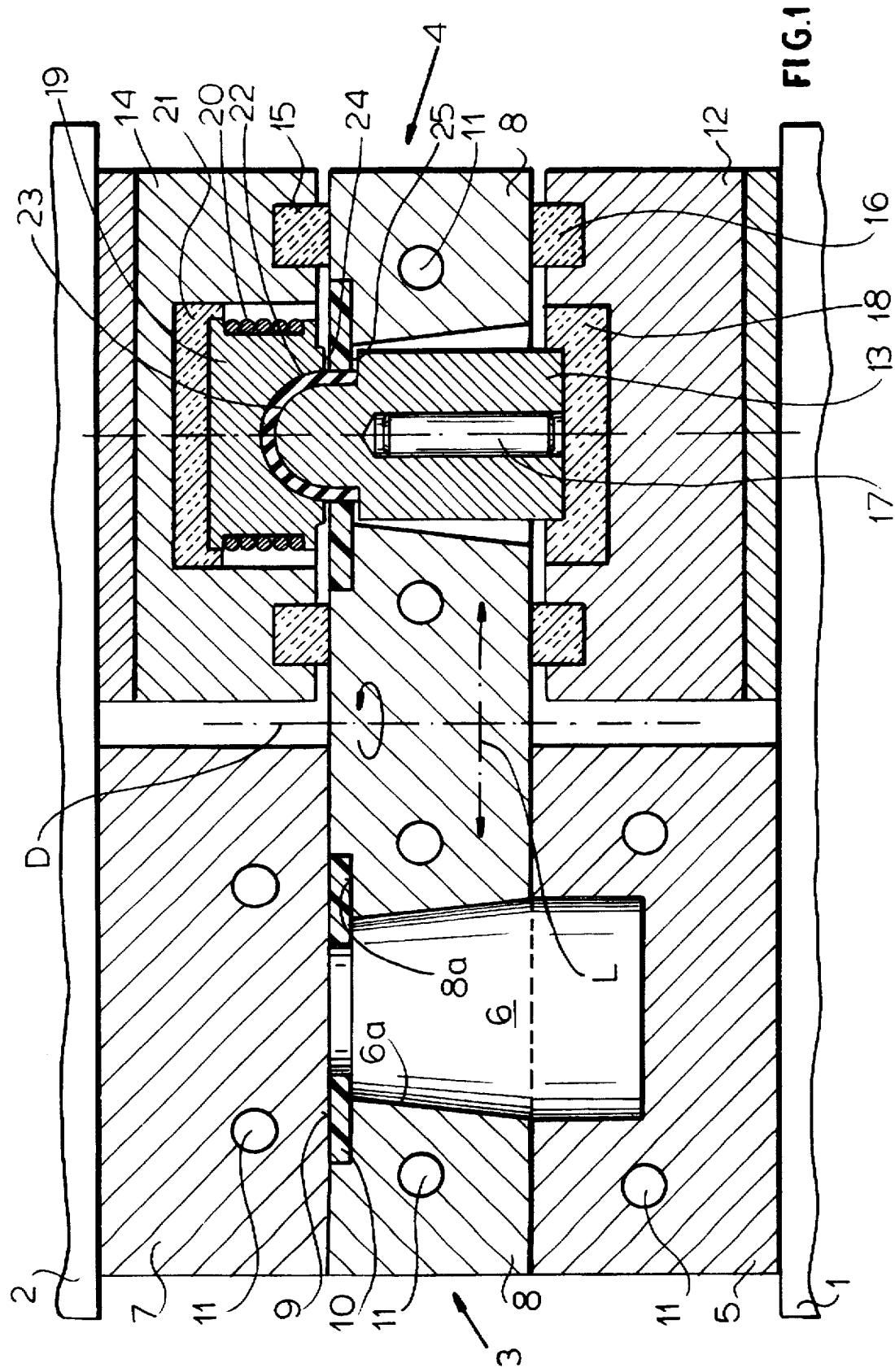
FIG. 1 is a section through an apparatus for injection molding articles composed of both thermoplastic and silicone portions according to the invention with the parts of the thermoplastic injection mold and the silicone injection mold being mounted on the mold plates of an injection molding machine which can be clamped together.

FIG. 1 shows parts of an injection molding machine having a pair of mold-carrying plates 1 and 2 which can be clamped together as is conventional to close the machine in injection molding, the plates 1 and 2 being separated to allow the molded article to be removed.

The plates 1 and 2 carry a thermoplastic injection mold 3 and a silicone injection mold 4.

The thermoplastic injection mold 3 has a first mold half 5 which may be mounted on the fixed plate 1 and provided with a rotationally symmetrical insert between the mold half 5 and another mold half 7 attached to the movable plate 2 as a transfer mold part 8 having a cavity 6a matching the configuration of the insert 6 so that, when the injection molding machine is closed as has been shown in FIG. 1, the insert 6, a recess 8a in the transfer plate 8 and the juxtaposed surface 9 of the mold half 7 define a mold cavity having the shape of a thermoplastic member 10 to be molded therein.

The member 10, forming the first portion of the article, can have a configuration of a washer. The system for forcing the thermoplastic synthetic resin into the mold cavity has not been illustrated and is conventional. Cooling passages 11 are provided both in the thermoplastic injection mold 5, 7 and in the transfer plate 8.

When the plate 2 recedes from the plate 1, i.e. the mold 5, 7 is opened, an insert 6 is withdrawn from the plate 8 which can be rotated or shifted to carry the injection molded portion 10 into the silicone injection mold 4.

The silicone injection mold 4 comprises a mold half 2 mounted on the fixed plate 1 and a mold half 14 mounted on the movable plate 2. The rotationally symmetrical mold part 13 is fixed to the mold half 12 and defines a mold cavity for the silicone part of the molded article with a member 19 affixed to the mold half 14.

Both the mold half 12 and the mold half 14 are spaced from the transfer part 8 by thermal insulation elements 15 and 16.

The portion 13 defining the second mold cavity is provided with a heating unit 17 in the form of a heating cartridge and is insulated from the mold half 12 by the insulating layer 18. Similarly, the part 19 which cooperates to define the second mold is heated by a heating coil 20 and is insulated from the remainder of the mold half 14 by the insulating layer 21. The members 13 and 19 define the second mold cavity 22 into which a silicone material is injected at high temperature as represented by the hemispherical article 23 which is secured by a form-fitting relationship to the thermoplastic molded part 10 as will be described, for example, with respect to FIGS. 2–5.

Between the mold parts 13 and 19 and the thermoplastic portion 10, respective air gaps 24 and 25 are provided, the gap widths being so dimensioned that these air gaps act as insulating gaps but are sufficiently small that no silicone material can penetrate through these gaps.

The transfer plate 8 can be rotated about an axis D so that the mold cavity for the first portion 10 can be filled with the first portion i.e. the thermoplastic and then the thermoplastic can form part of the second mold cavity 22 in the first and second positions of the member 8. Instead of a rotary movement, the transfer part 8 of the injection mold can have a linear drive, i.e. is guided for linear back and forth movement as represented by the arrow L.

In operation, first the injection molded part 10 is formed and the mold assembly is opened to withdraw the member 6 from the plate 8 and the member 13 from the plate 8, enabling the plate 8 to shift linearly or rotationally so that upon reclosing of the mold, the molded member 10 lies in the second cavity 22. At high temperature the silicone is injected and after setting of the silicone, the assembly is again opened and removal of the injection-molded article is possible.

As can be seen from FIGS. 1–5, the article made has a washer of thermoplastic material in the central opening of which the rim of a hemispherical portion of silicone is injection molded.

Figure 2:
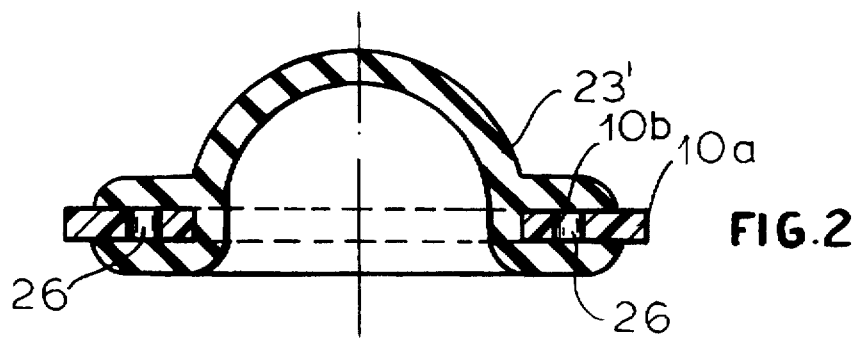
FIG. 2 is a half section through a rotationally symmetrical injection molded article showing a form-fitting connection between thermoplast and silicone parts.

In the article of FIG. 2, the washer 10a is also provided with bores 10b which are filled with the silicone material during the second injection molded step to form the hemispherical member 23'. The bores are then filled with pins 26 unitary with the balance of the hemispherical member which is then formed.

Figure 3:
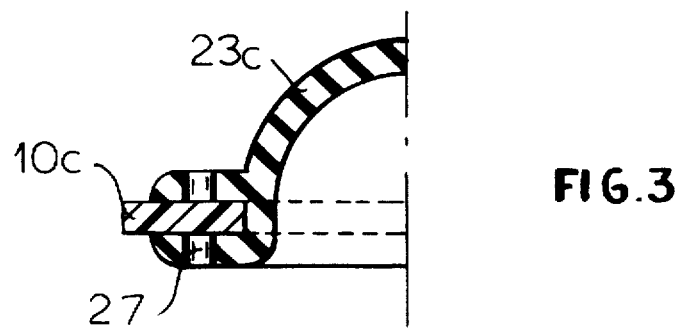
FIG. 3 is a half section showing another embodiment of the article of FIG. 2.

In the embodiment of FIG. 3 the washer 10c has pins 27 about which the silicone of member 23c is injection molded.

Figure 4:
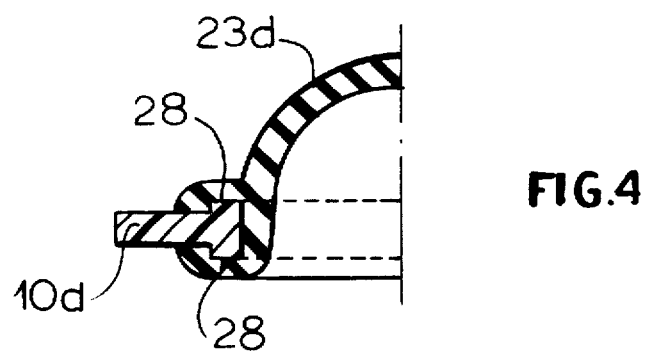
FIG. 4 is a half section through an inner injection molded article made in accordance with the invention.

FIG. 4 shows an embodiment in which the form-fitting connection is a result of a bead 10d around which the injection-molded material is formed and which engages around the beads 28 of the thermoplastic material. The silicone body is here represented at 23d as well.

Figure 5:
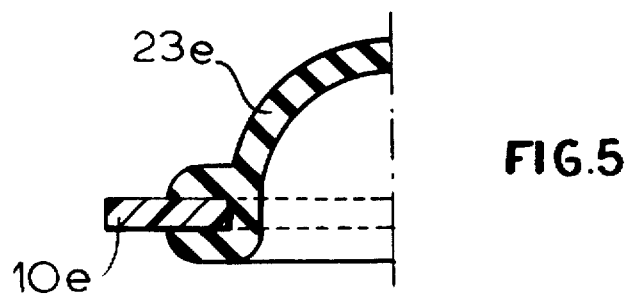
FIG. 5 is a half section of still a further embodiment of such an article.

In FIG. 5 the member 10e is straddled by the silicone material of the hemispherical member 23e in providing the form-fitting arrangement.

We claim:

1. An apparatus for producing an injection-molded article having a first portion composed of a low-melting-point thermoplastic synthetic resin and another portion composed of a silicone, said apparatus comprising:
 a transfer injection mold part defining a portion of a shape of said article;
 a thermoplast injection mold cooperating with said transfer injection mold part in a first position thereof to form a first cavity therewith for producing said first portion;
 a silicone injection mold disposed next to said thermoplast injection mold and cooperating with said transfer injection mold part in a second position thereof and with said first portion on said transfer injection mold part to form a second cavity therewith for producing said other portion on said first portion to complete said article;
 means for heating said silicone injection mold to an elevated temperature; and
 means for limiting heat transfer from said silicone injection mold to said first portion on said transfer injection mold part.

2. The apparatus defined in claim 1 wherein said silicone injection mold rests pressurelessly against said first portion on said transfer injection mold part.

3. The apparatus defined in claim 1 wherein said means for limiting heat transfer from said silicone injection mold to said first portion on said transfer injection mold part includes air gaps between heated parts of said silicone injection mold and said transfer injection mold part.

4. The apparatus defined in claim 3 wherein said air gaps are dimensioned with respect to capillarity of said silicone to prevent incursion of the silicone into said air gaps.

5. The apparatus defined in claim 1 wherein said means for limiting heat transfer from said silicone injection mold to said first portion on said transfer injection mold part includes insulating elements between parts of said silicone injection mold and said first portion.

6. The apparatus defined in claim 5 wherein said insulating elements are composed of ceramic.

7. The apparatus defined in claim 5 wherein said insulating elements form spacers maintaining a predetermined positioning of said transfer injection mold part and said parts of said silicone injection mold.

8. The apparatus defined in claim 1, further comprising means defining an axis of rotation for said transfer injection mold part enabling rotation thereof between said positions.

9. The apparatus defined in claim 1, further comprising means defining a linear path for said transfer injection mold part enabling shifting thereof back and forth between said positions.

10. The apparatus defined in claim 1 wherein said means for heating comprises a heater located adjacent said second cavity, and at least one layer of thermal insulation separating said heater from another part of said silicone injection mold.

11. The apparatus defined in claim 1, further comprising means for cooling said transfer injection mold part.

12. The apparatus defined in claim 1 wherein the thermoplast injection mold and the silicone injection mold are both mounted upon common mold-carrying plates adapted to be clamped together of an injection molding machine.

13. The apparatus defined in claim 1 wherein said cavities are so configured that said portions interfit in a shape-locking junction upon molding of said other portion on said first portion.

14. The apparatus defined in claim 13 wherein said cavities are so shaped that said first portion has throughgoing passages filled with material of said other portion.

15. The apparatus defined in claim 13 wherein said first portion has undercuts filled with material of said second portion.

* * * * *